April 12, 1927.

L. HOLLAND-LETZ 1,624,244

GEAR CHANGING MECHANISM

Filed July 7, 1921   11 Sheets-Sheet 7

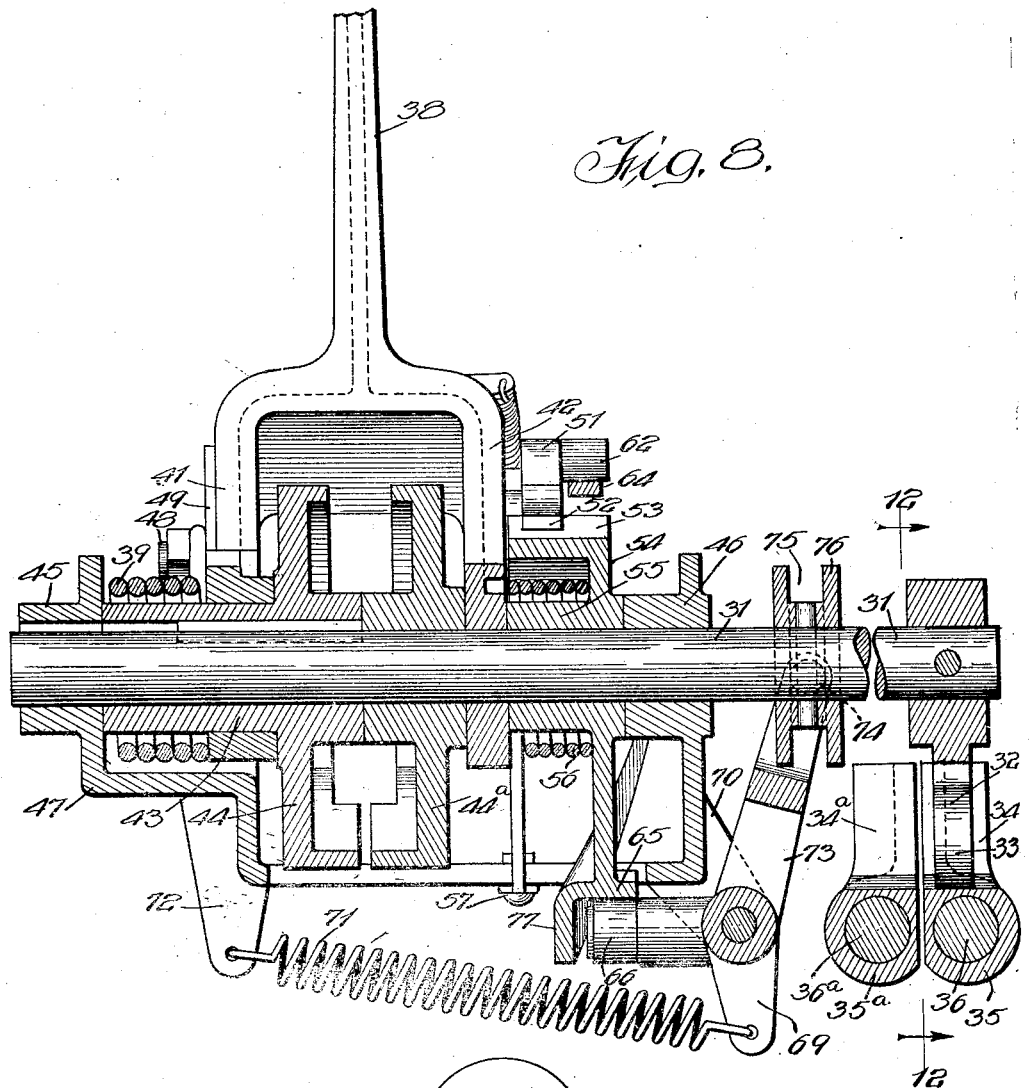
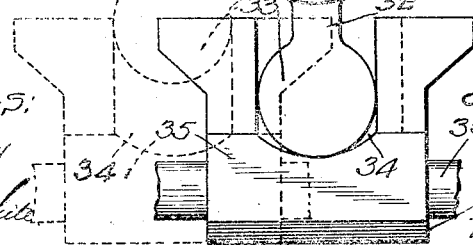

April 12, 1927.

L. HOLLAND-LETZ 1,624,244

GEAR CHANGING MECHANISM

Filed July 7, 1921   11 Sheets-Sheet 9

April 12, 1927.

L. HOLLAND-LETZ 1,624,244

GEAR CHANGING MECHANISM

Filed July 7, 1921    11 Sheets-Sheet 10

Witnesses:
W. F. Kilroy
Harry R. L. White

Inventor
Ludwig Holland-Letz
By John Howard McElroy
his Atty.

April 12, 1927.

L. HOLLAND-LETZ 1,624,244

GEAR CHANGING MECHANISM

Filed July 7, 1921  11 Sheets-Sheet 11

Witnesses:
W. F. Kilroy
Harry B. White

Inventor:
Ludwig Holland-Letz
By John Howard McElroy
his Atty.

Patented Apr. 12, 1927.

1,624,244

UNITED STATES PATENT OFFICE.

LUDWIG HOLLAND-LETZ, OF OAK PARK, ILLINOIS.

GEAR-CHANGING MECHANISM.

Application filed July 7, 1921. Serial No. 483,091.

My invention is concerned with gear shifting mechanism for tractors, and is more especially concerned with such mechanism as can be manipulated by pulling a single line from any desired position to the rear or at one side of a tractor, so that the same can be controlled without the necessity of being on it. To this end it consists of a novel combination of elements connected to the forks of the customary forms of gear shifting device so that by pulling on the line in a certain manner, the gears can be meshed to drive the tractor forward or backward at any speed for which the gearing is designed.

In illustrating my invention in a preferred form of the many in which it can be embodied, I have shown it as applied to a customary type in which if a single gear shifting lever were employed, it might move from a neutral position either to the right or left, to engage with one or the other of the two sliding shafts, each connected to its respective fork, and then be shoved backward or forward to shift the selected one of the two sliding gears moved by the two forks into mesh with the necessary gears to secure the selected one of the four drives possible with this type of gearing.

Of the figures shown in the eleven sheets of drawings hereto annexed, in which the same reference numerals are applied to the same parts in all of the figures, Figs. 1 and 1ª are somewhat diagrammatic views in side elevation and top plan, respectively, of a tractor having my inventions applied thereto;

Fig. 8 is a vertical section on the line 8—8 of Fig. 2;

Figure 1:
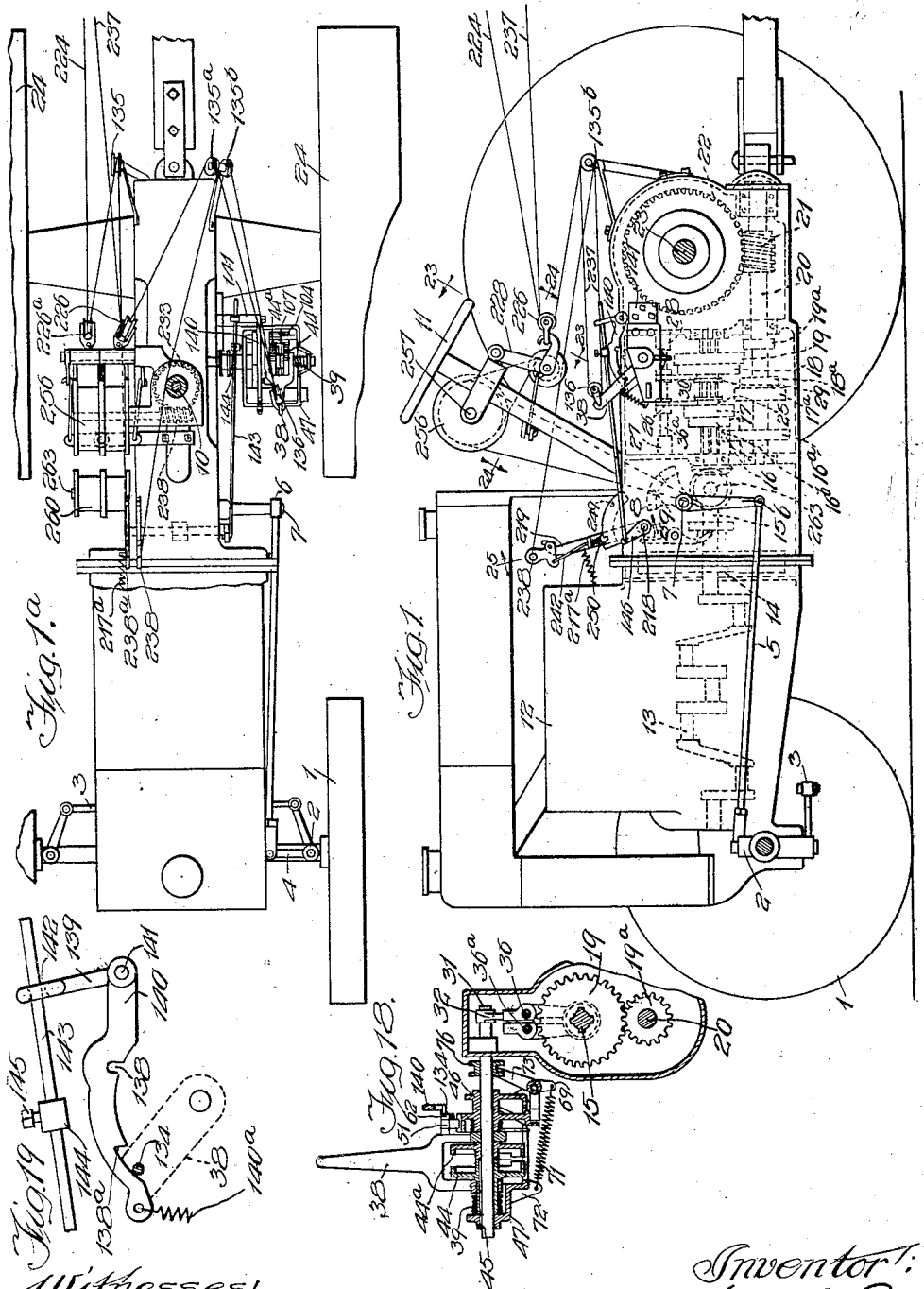
Figure 2:
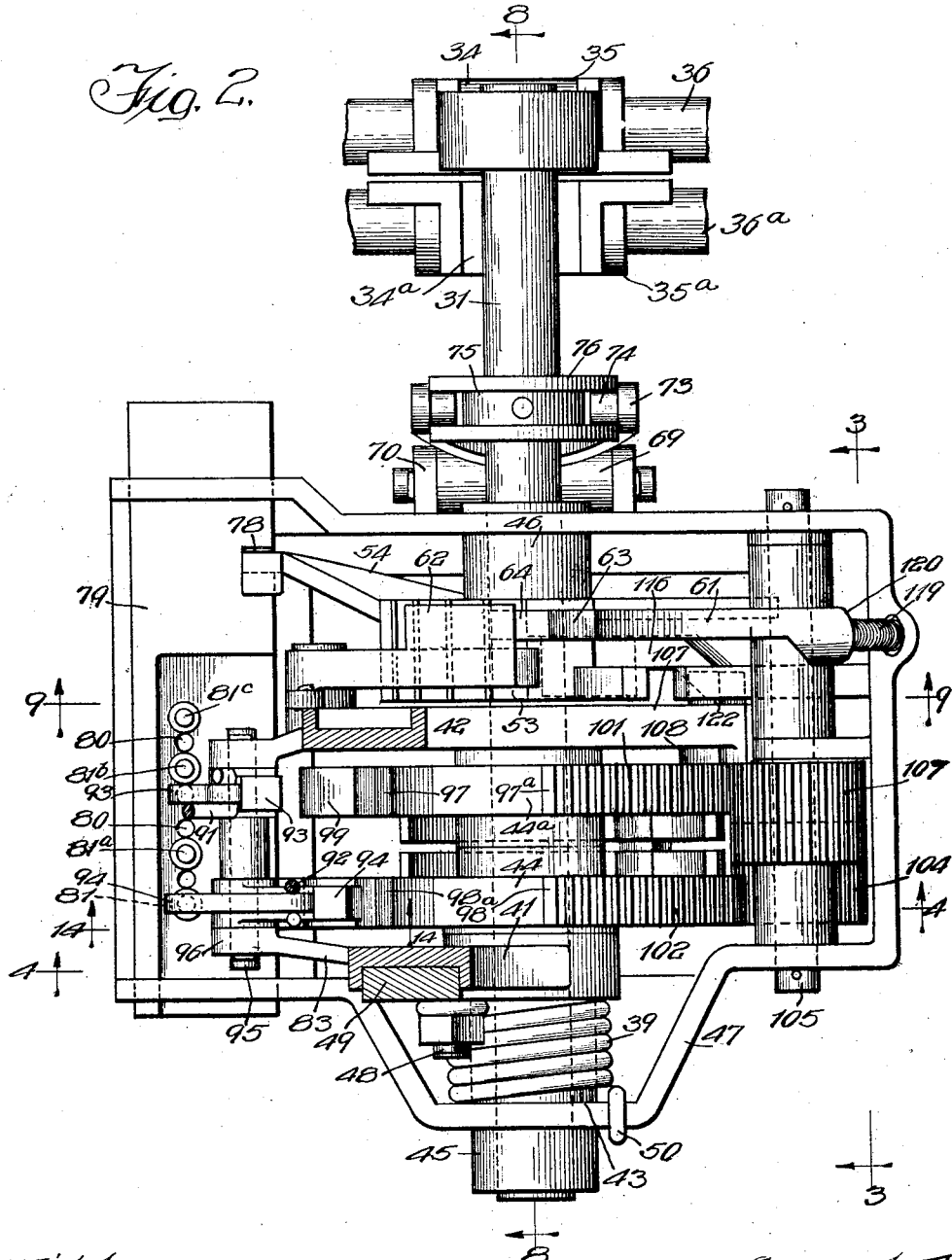
Fig. 2 is a top plan view of the mechanism with the upper portion of the actuating lever cut away.
Figure 3:
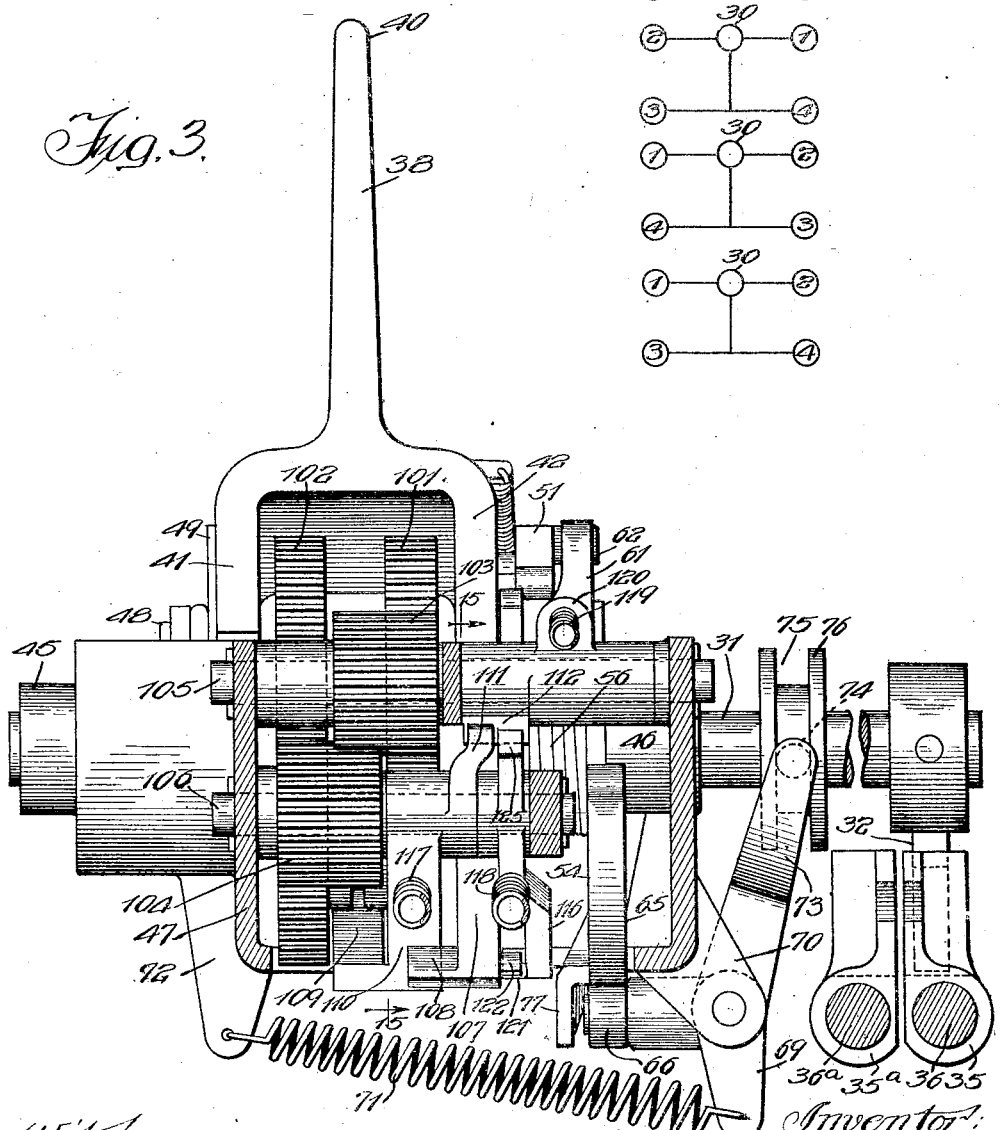
Fig. 3 is a view of the mechanism as seen in end elevation in section on the line 3—3 of Fig. 2.
Figure 4:
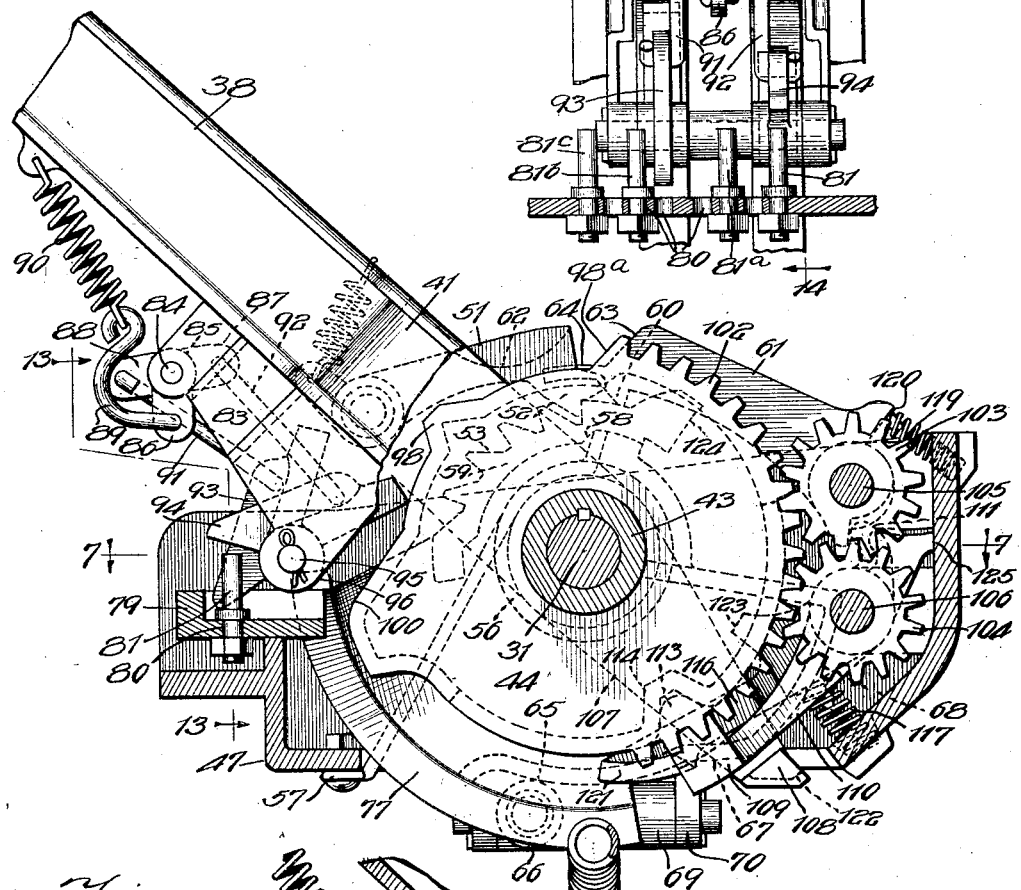
Fig. 4 is a view in vertical section as seen on the line 4—4 of Fig. 2.
Figure 11:
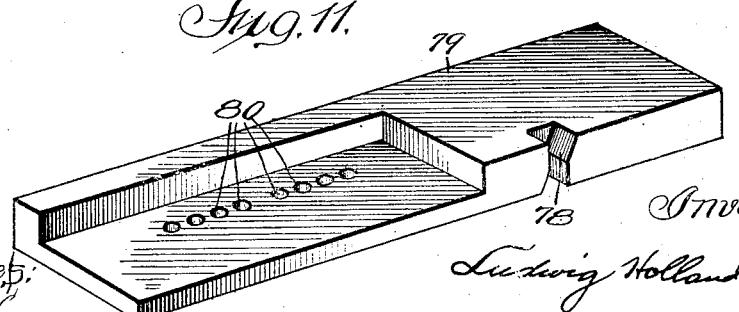
Figure 16:
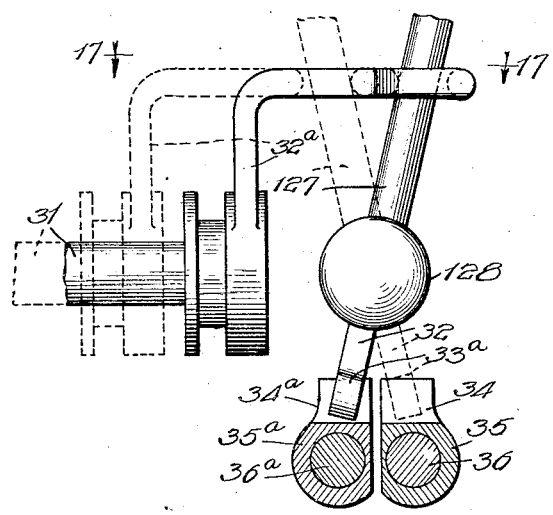
Figure 17:
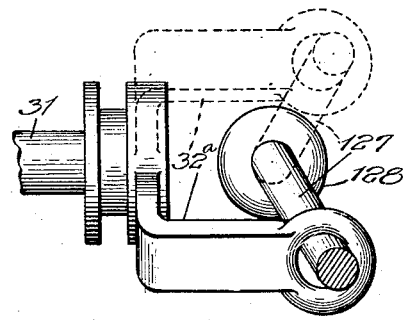
Figure 23:
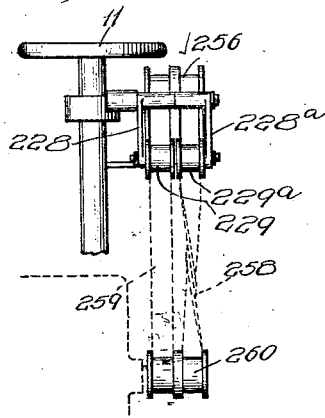
Figure 24:
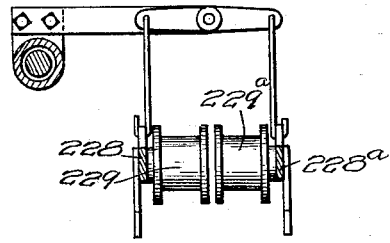
Figure 25:
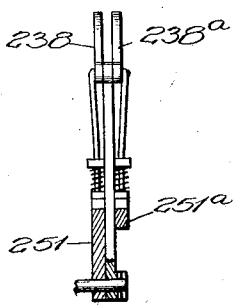
Figure 26:
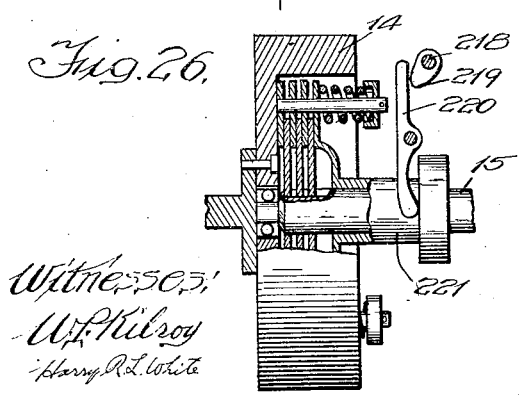
Figure 21:
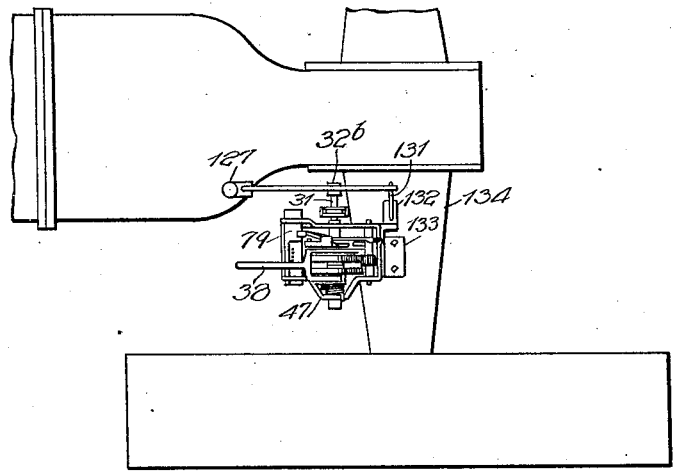
Figure 20:
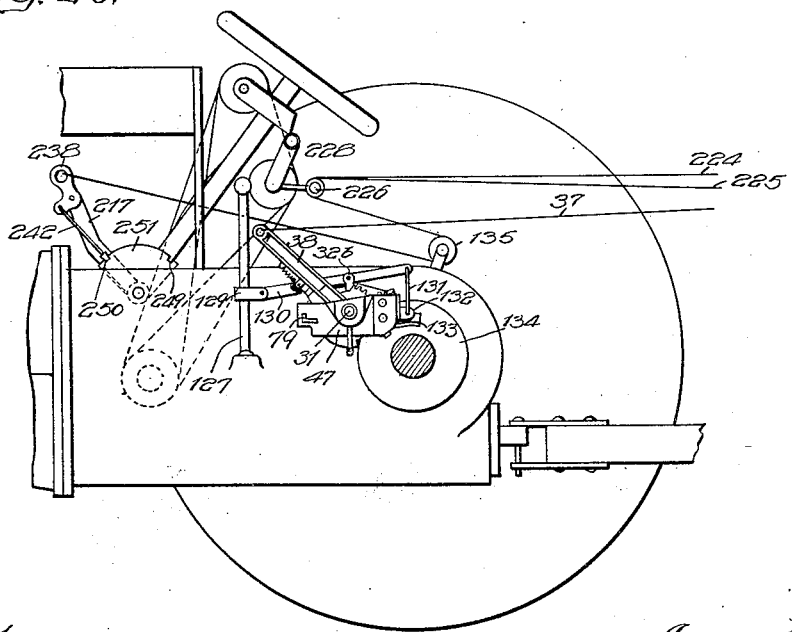

Fig. 11, sheet 7, is a perspective view of the adjusting slide detached;

Fig. 12, sheet 8, is a view in section on the line 12—12 of Fig. 8;

Fig. 13, sheet 4, is a rear elevation in section on the line 13—13 of Fig. 4;

Fig. 14 is a detail in section along the line 14—14 of Fig. 2;

Fig. 15, sheet 5, is a detail in section on the line 15—15 of Fig. 3;

Fig. 16, sheet 10, is a view similar to the right hand end of Fig. 3 but illustrating a modification;

Fig. 17 is a section on the line 17—17 of Fig. 16;

Fig. 18 (sheet 1) is a vertical section as seen through the wheel 19 seen in Fig. 1;

Fig. 19 is an enlarged detail of a portion of the interlocking mechanism seen in Fig. 1;

Figs. 20 and 21 are a side elevation and a top plan view respectively of my invention as applied to a tractor by connecting it to the customary gear shifting lever instead of directly to the slide shafts which control the sliding gears;

Fig. 22, sheet 3, shows in a diagrammatic form several possible arrangements of the different speeds;

Figs. 23, 24 and 25 are details of portions of the supporting mechanism as seen in section on the lines 23—23, 24—24 and 25—25 respectively, of Fig. 1; and Fig. 26 is a detail partly in section showing the engine clutch and a portion of the operating mechanism therefor.

Referring first to Figs. 1 and 1ª, 1 represents the steering wheels of the tractor journaled on the customary steering knuckles 2, connected by the link 3, and having the arm 4 of one of the angles connected by the link 5 with the arm 6 secured on the rock shaft 7 carrying beveled gear sector 8 with which meshes the bevel pinion 9 secured on the steering shaft 10, which may be manipulated by the hand wheel 11 in the customary manner. The power is applied by the customary engine 12 to the crank shaft 13, which is connected by the clutch 14 (see Fig. 26) with the driving shaft 15 having splined thereon the duplex spur gears 16, 17 and 18, 19 adapted to mesh with the gears 16ª, 17ª, 18ª, and 19ª, respectively, secured on the drive shaft 20 carrying the worm 21 meshing with the worm gear 22 on the customary differential which, through the shafts 23 drive the traction wheels 24. The gears 16, 17 have in their common hub the annular channel 25, receiving the fork 26 secured on the shaft 36 mounted to slide in the bearings 27 and 28, and the gears 18, 19 have in their common hub the annular channel 29 receiving the fork 30 secured on the shaft 36ª mounted to slide in adjacent bearings to the bearings 27 and 28. When the shaft 36 is slid forward to cause the gear 16 to mesh with the gear 16ª through the intermediate gear pinion 16ᵇ the tractor moves at at its slowest speed backward; when it is slid backward to cause the gear 17 to mesh with the gear 17ª the tractor moves forward at its second speed. When the shaft 36ª is slid backward to cause the gear 18 to mesh with the gear 18ª the tractor moves forward at its third speed, and when the shaft 36ª is slid forward to cause the gear 19 to mesh with the gear 19ª, the tractor moves forward at its highest speed. In their intermediate or neutral positions shown on the drawing, the tractor is at rest, as none of the gears are engaged, although the engine clutch is illustrated in this figure as operative. All the mechanism thus far described is old and well known and per se, forms no part of my present invention.

Referring now to Figs. 3, 22, 8 and 12, the circle marked 30, in Fig. 22, represents the neutral position of the customary gear shifting lever as I employ it in which the gears are not in mesh, and the machine is at rest, even if the engine is clutched. The other circles with the 1, 2, 3 and 4 inside them represent the positions to which the lower end of the gear shifting lever must be moved for the four speeds, and it will be noted from the three lower diagrams that these positions may be interchanged to suit the wishes of the operator.

Assuming that the drawings represent the first arrangement, shown in Fig. 22, and referring to Figs. 8 and 12, there the parts are in their neutral position in which the shaft 31 is at its extreme right hand position with the arm 32 depending directly downward, and having its rounded end 33 engaging the recess 34 formed in the top of the abutment lug 35 pinned or otherwise secured on the sliding shaft 36, already described, which is shown in the neutral position and which is shoved inward from said neutral position to mesh so as to secure the first speed, and which is pulled outward from said neutral position to secure the second speed. To move it to the first and second position from neutral, all that is necessary is to rock the shaft 31 sixty degrees (for example) clockwise or anti-clockwise, seen from the left in Fig. 8. To move it to the third or fourth position, the shaft 31 while in its neutral position has first to be slid to the left far enough to carry the head 33 out of the recess 34 of the lug 25 into the recess 34ª of the abutment lug 35ª of the sliding shaft 36ª, after which it is rocked as before, clockwise or anti-clockwise, as the case may be, to engage the other sliding gear for the third or fourth speeds. The cord or line 37, seen in full lines in Fig. 20 and dotted in Figs. 1 and 1ª, is attached to the end of the lever 38, fulcrumed, as will be more fully described later, on the shaft 31, and the problem is to furnish connections between the lever 38 and the shaft 31 such that by simply pulling on the line 37, the shaft 31 can be moved at will from its normal position shown in full lines in Fig. 8 to its dotted line position (if the third or fourth speed is desired) and rocked from either position sixty degrees, clockwise or anti-clockwise, depending upon what speed, first or second, or third or fourth, is required. Of course it must be capable of being similarly moved (by pulling the line 37) from any of these positions back to the neutral.

Figure 5:
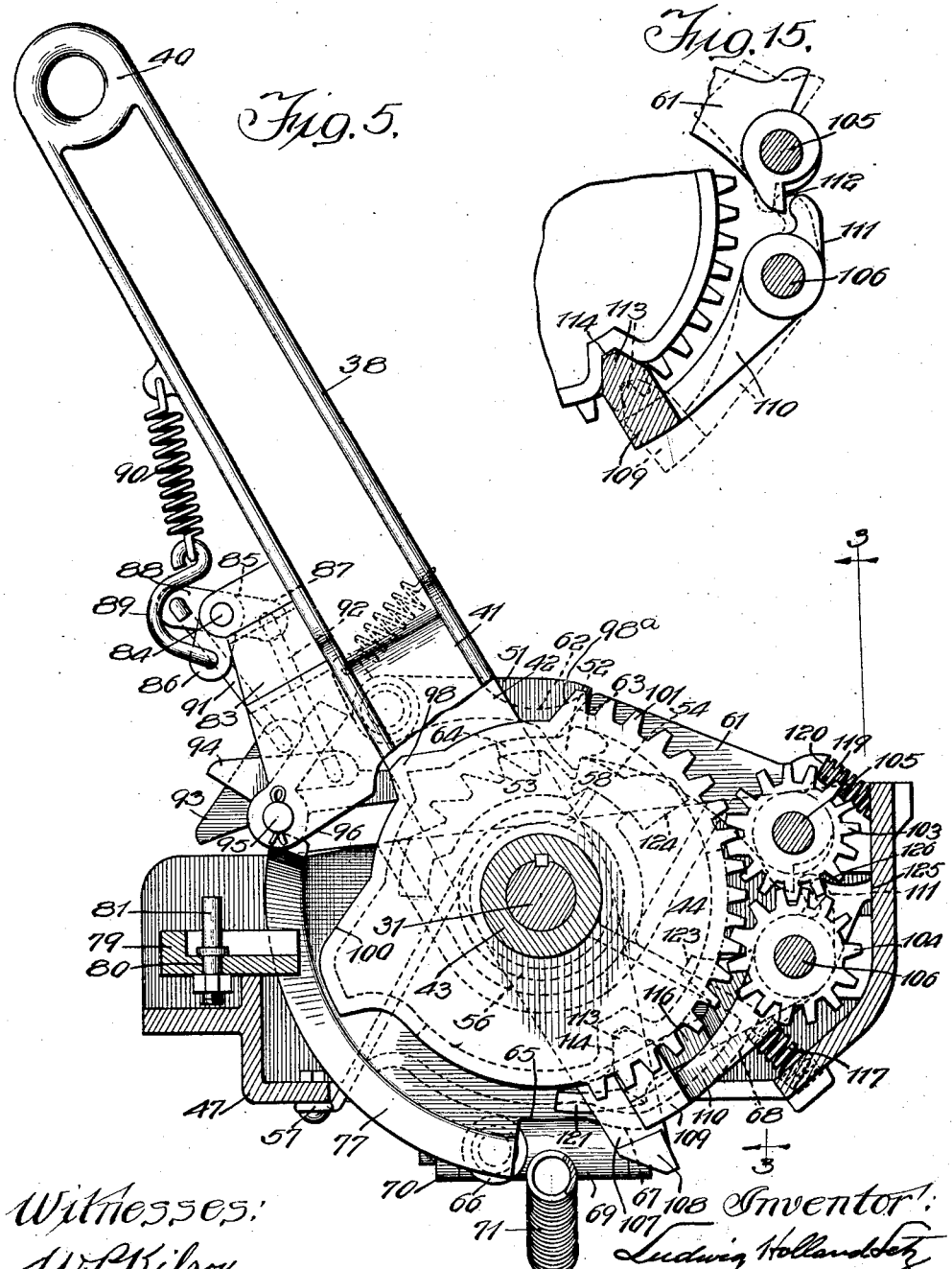
Fig. 5 is a view of the same mechanism shown in Fig. 4, but with the operating lever moved from the initial position shown in Fig. 4 to the intermediate position shown in Fig. 5.
Figure 6:
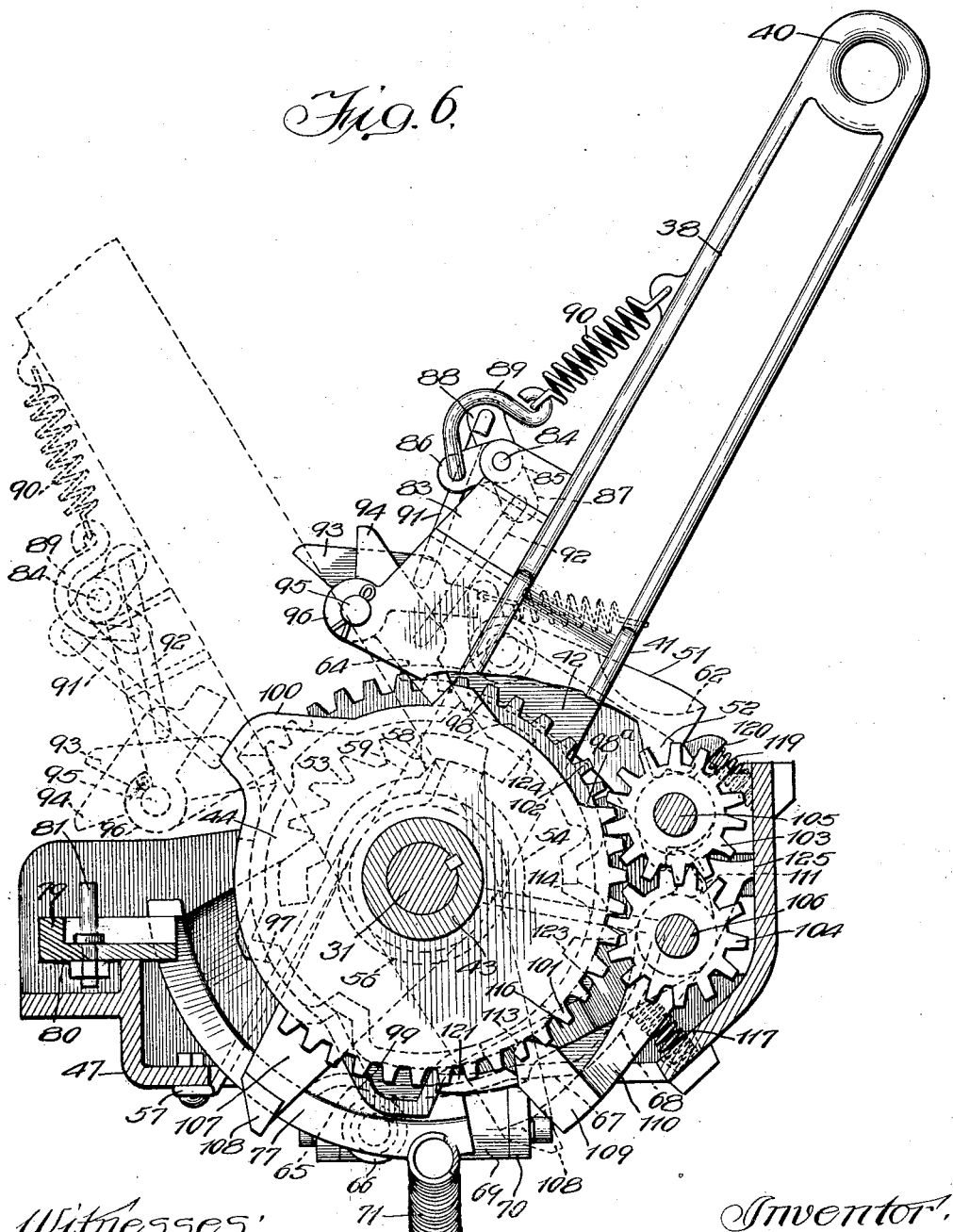
Fig. 6 is a view to Figs. 4 and 5 but with the lever shown in full lines as moved to its final position.

Before describing the mechanism in detail, and referring to Figs. 4, 5 and 6, I may say that the elements are represented in the neutral, or initial position, as I prefer to call it, in Fig. 4, and to move the shaft to the first position, you first pull the lever 38 to the intermediate position shown in Fig. 5, which movement sets the elements of the connections so that when you swing the lever on to its final position, shown in Fig. 6, the shaft 31 with its head 33 in the recess 34 is rocked 60 degrees clockwise to slide the shaft 36 inwardly to mesh the gears in the first speed. If, however, you want to start from second speed, the pull of the lever 38 from initial to intermediate position would have to be repeated, after which the final pull from intermediate to its final position will rock the shaft 31 sixty degrees anti-clockwise, pulling out the shaft 36 to mesh the gears in the second speed. If, however, you want to start from the third speed, the selecting pull of the lever from initial to intermediate position has to be made three times, the third pull sliding the shaft 31 to the left so that the head 33 is in the recess 34ª and the final operating pull rocks it sixty degrees clockwise to shove the shaft 36ª inward to mesh the gears in the third speed. For the fourth speed, the selecting pull of the lever 38 to intermediate position would have to be made four times before the operating pull to final position which serves to rock the shaft sixty degrees anti-clockwise and pull out the shaft 36ª to mesh the gears for the fourth speed. To return the gears to neutral at any time from any speed, all that is necessary is to pull the lever 38 from its intermediate position to its final position, and it will be understood that every time the lever 38 is pulled to its intermediate position and released, the helically coiled torsional spring 39 returns it to its initial position. If it is pulled on through to its final position after the selecting stroke or strokes, and released, it returns to the intermediate position shown in dotted lines in Fig. 6. If during the setting movements of the lever 38 from initial to intermediate position a mistake is made, all that is necessary is to continue the selecting pulls without making a final pull, as the fifth selecting pull returns all the parts to their neutral or initial position, enabling the operator to begin all over again.

The operating lever 38 has the ring 40 in its end for attachment of the line 37 and at its fulcrum is a yoke forming the arms 41 and 42, which have bearings on the hub 43 of the gear shifting sector 44 splined on the shaft 31 and on the shaft 31, respectively, as shown in Fig. 8. The shaft 31 is mounted to slide and rock in the bearings 46 and 45 formed in the sides of the casing or frame 47 which is shaped to accommodate the elements which it encloses and which are to be described. The spring 39 surrounding the hub 40 has one end engaging the stud 48 screwed through the bearing portion 49 into the body of the arm 41 (the bearing portion 49 being formed separately from the body of the arm 41 to make assembly possible) while the other end 50 is hooked over the casing, as seen at Fig. 2, so that the tension of the spring 39 always tends to return the lever 38 to its initial position shown in Fig. 4 from whatever position it is moved to by pulling the line 37. The other arm 42 of the lever 38 has pivoted to it the spring-pressed operating dog 51 (see Figs. 2 and 8), the nose 52 of which engages the teeth 53 of the cam sector 54 seen in Figs. 2 to 10.

Figure 7:
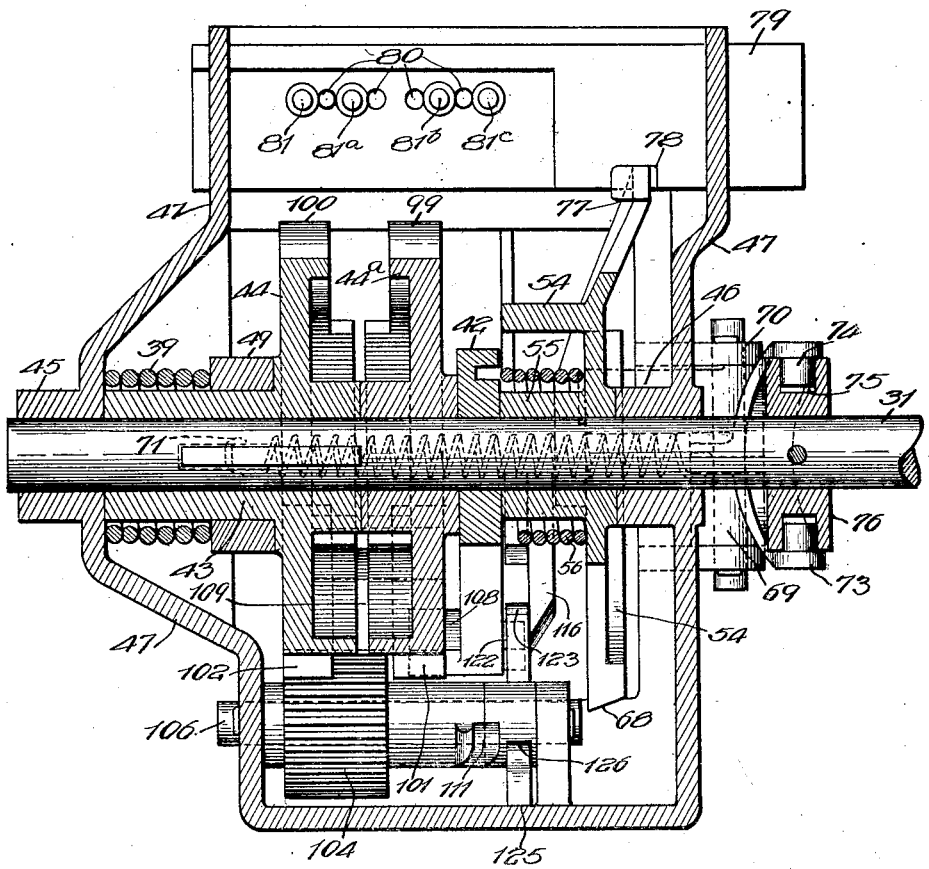
Fig. 7 is a plan view in section on the line 7—7 of Fig. 4.
Figure 9:
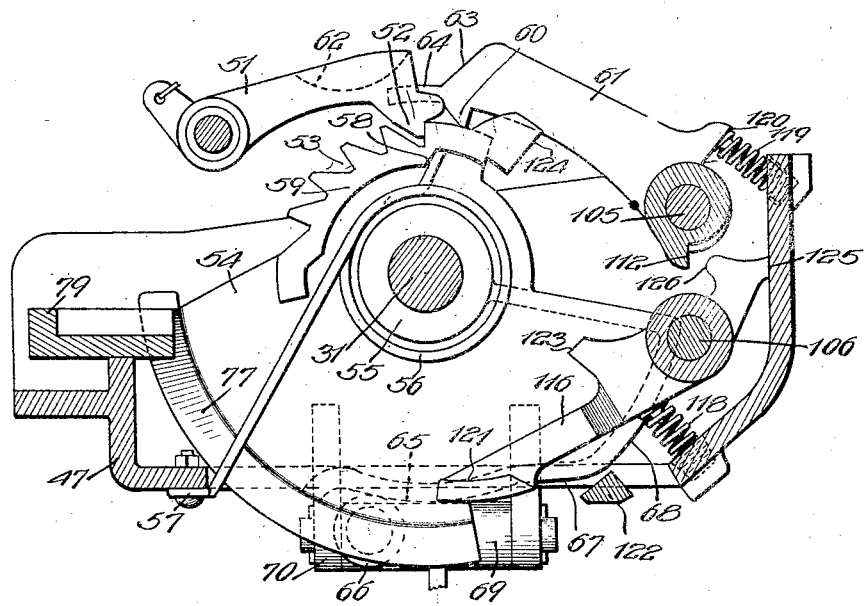
Fig. 9 is a view in section on the line 9—9 of Fig. 2 with the parts seen in their initial position.
Figure 10:
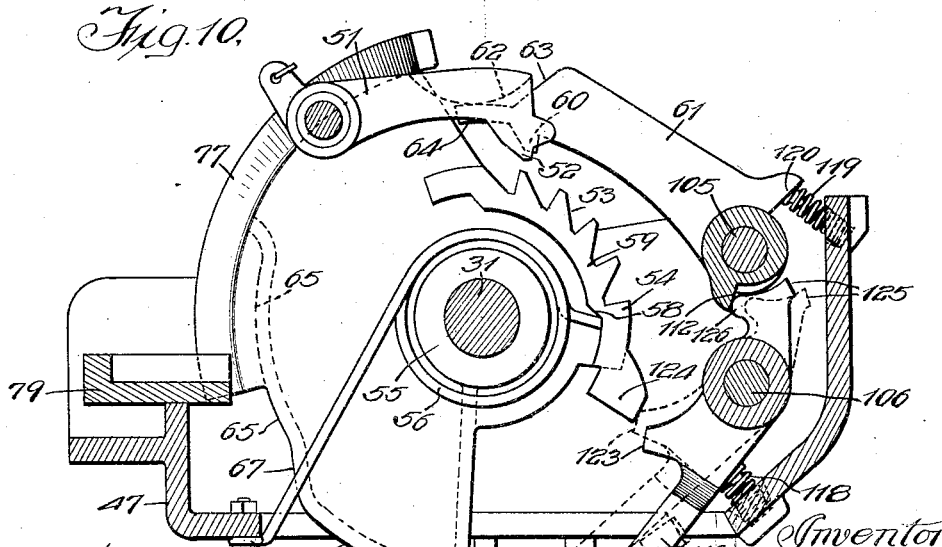
Fig. 10 is a similar view but with the parts there shown advanced to their final position preparatory to their automatic return.

As seen in Figs. 7 and 8, this cam sector has a hub portion 55 on the shaft 31 surrounded by a helically coiled torsional spring 56 fastened to the frame or casing at one end 57 (see Figs. 9 and 10) while its other end engages the offset 58 formed on the under side of the flange 59 provided to widen the faces of the teeth 53, so that the cam sector 54 always returns to initial position under its stress when the hooked nose 60 of the dog 61 pivoted on the rod 105 extending across the front of the casing is lifted out of the teeth 53 simultaneously with the nose 52 of the dog 51. These parts are shown in their initial position in Fig. 9, and when the lever 38 is pulled to the intermediate position the dog 51 advances the cam sector one tooth, in which advanced position it is caught by the hooked nose 60 of the dog 61. If the lever 38 is pulled beyond this intermediate position, the cam sector is not advanced any further because the flange 62 extending from the adjacent side of the dog 51 rides up over the cam surface 63 of the dog 61 and is lifted out of the teeth 53 before it can advance them another tooth. An extension 64 of the dog 61 is normally beneath the flange 62, so that if the dog 61 is rocked upward when the lever 38 is in an intermediate position, as seen in Fig. 10, both dogs 51 and 61 are lifted to allow the cam sector 54 to fly back to its initial position. This cam sector 54 has on its periphery a low surface 65, which as seen in Fig. 9, is over the anti-friction roller 66 while it is in its initial position or in its first or second adjustment. As it is given its third selecting movement by the third swing of the lever 38 from initial to intermediate position, the cam surface 67 forces the roller 66 downward where it is held during the third and fourth movements by the high surface 68. As seen in Figs. 3 and 8, the roller 66 is journalled on the horizontal arm of the three-armed lever 69 fulcrumed in the yoke 70 projecting from the casing 47, and is held in contact with the surfaces 65 and 68 by the helically coiled contractile spring 71 fastened at one end to a second arm of the lever 69 and to a projection 72 from the casing 47. The third arm of the lever 70 terminates in a fork 73 having the pins 74 projecting into the annular groove 75 of the collar 76 pinned on the shaft 31 so that as the cam sector 54 passes from its second selecting stroke position to its third, the shaft 31 is forced to the left to bring the head 33 into the recess 34ª for the third and fourth speeds.

The cam sector 54 also has a cam flange 77 on its periphery extending into the recess 78 in the adjacent edge of the selecting slide 79 mounted to slide horizontally in suitable bearings in the ends of the casing 47, as seen in Fig. 7. This slide contains two sets of four holes 80, adapted to have secured therein four pins 81, 81ª, 81ᵇ and 81ᶜ, by the nuts 82 seen in Fig. 5. By properly placing these four pins in these eight holes 80, the mechanism can be set for any one of the four arrangements shown in Fig. 22, and this constitutes an important feature of my invention, because obviously when the tractor is to be mainly used on any particular speed, as the second, for instance, it is desirable to adjust the pins 81, etc., so that the first swing of the lever 38 will set it for the second speed. If it is to be used, at another time, mainly on the first speed, obviously the pins 81, etc., will be set so that the first swing of the lever 38 will set it for the first speed, and so on as illustrated in Fig. 22. The cam flange 77 is so proportioned in its generally helical trend that each time it is advanced one tooth the slide 79 is advanced the distance between the centers of the adjacent holes 80. The purpose of this adjustment will be explained later.

As best seen in Figs. 4, 5, 6, 13 and 14, the lever 38 has on its rear adjacent where it forks a housing bracket 83 composed of a pair of stepped symmetrical sides, one for each branch of the fork. Journaled on a rod 84 across the top of the housing and supported thereby is an equalizing sleeve 85 having three arms 86, 87 and 88. A link 89 connects one arm with a helical contractile spring 90, secured at its other end to the lever 38, while a pair of links 91 and 92 connect the arms 87 and 88 with the pair of dogs 93 and 94 fulcrumed on the rod 95 supported in bearings 96 in the sides of the bracket 83. The tails of these dogs or setting levers 93 and 94 co-operate with the pins 81, etc., while their noses co-operate with the shoulders 97 and 98 and the cam surfaces 99 and 100 on the peripheries of the gear shifting sectors 44 and 44ᵃ, respectively. The above described connections are such that when the tail of the dog 93 during the return of the lever 38 to initial position, after its first selecting stroke, engages the pin 81ᵇ, it is rocked to bring its nose into the arc through which the shoulder 97 on the sector 44ᵃ moves, and that the dog 94 is at the same time rocked to bring its nose out of the arc of movement of the shoulder 98. Similarly, when the relative movement of the dog 94 and the sector 44 causes the cam surface 100 to throw the dog 94 out of the arc of the movement of the shoulder 98, the dog 93 will have its nose thrown into the arc of movement of the shoulder 97 on the sector 44ᵃ, and the spring 90 holds the dogs securely, but yieldingly, in either position.

Referring to Figs. 2, 3, 7 and 8, it will be noted that the two gear shifting sectors 44 and 44ᵃ are symmetrical, except that the hub of the sector 44 is elongated and is splined on the shaft 31, while the sector 44ᵃ is free to rotate on said shaft, but always in the opposite direction to the rotation of the sector 44, it being geared to it to secure that result by the teeth 101 and 102 on the peripheries of the sectors 44ᵃ and 44, respectively, meshing with their respective pinions 103 and 104, which mesh with each other and are journaled on the bearing shafts or rods 105 and 106, respectively, supported in the casing 47. As a result of these connections the gear shifting sectors 44 and 44ᵃ always rotate in unison to the same extent, but in the opposite direction.

As best seen in Figs. 3, 4, 5, 15, 9 and 10, the arm 42 of the lever 38 has an extension 107 below the shaft 31, and on the side toward the gear sector 44ᵃ it has a lug 108 adapted to strike on its return movement from its final position (see the dotted line position of Fig. 6) the head 109 of the lever 110 fulcrumed on the rod 106 and having an arm 111 adapted to engage the shoulder 112 on the hub of the dog 61. The nose 113 of the lever 110 normally (as seen in Fig. 15) engages the recess 114 formed in the inwardly projecting flange 115 of the gear shifting sectors 44ᵃ, and it will be understood that I might preferably have it engage a similar recess in the corresponding flange of the gear shifting sector 44 but as both sectors necessarily move together, it is not essential to have recesses in both. Also fulcrumed on the shaft 106 adjacent the lever 110 is a lever 116, both of which (as seen in Figs. 3, 5 and 9) are held with their lower ends forced toward the periphery of the gear shifting sector 44ᵃ by the helical expanding springs 117 and 118 interposed between the lower arms of the levers and the adjacent wall of the casing 47, being held in place in recesses provided in the casing for that purpose. A similar spring 119 interposed between the wall and an abutment 120 on the dog 61 holds the latter in operative position. The lever 116, as best seen in Figs. 9 and 10, has on its lower end a cam flange 121 adapted to co-operate with a cam lug 122 on the end of the lever 38 directly opposite the lug 108, together with the shoulder 123 adapted to be engaged by the lug 124 forming the end of the flange 59 on the cam sector 54 when a fifth selecting stroke to intermediate position is given to the lever 38 to swing the lever 116 out until its lug 121 is in the path of the lug 122 of the lever 38 during its further stroke to its final position. This lever 116 has on its upper end a stop surface 125 to engage the casing 47 and position it normally, and a lug 126 also to engage the shoulder 112 on the dog 61.

The operation of the device is as follows: Assuming that the pins 81, etc., are set for the first arrangement of the speeds seen in Fig. 22, and that all the parts are in the initial position shown in Figs. 2, 3, 4, 7, 8 and 9, with the gear shifting mechanism at the neutral point 30 of Fig. 22, and that it is desired to set it for the first speed; the line 37 is pulled as far as possible carrying the lever 38 from the position shown in Fig. 4, through that of Fig. 5, to that of Fig. 6, when it is released and returned by the spring 39 to the dotted line position of Fig. 6. During the forward movement from the initial to the intermediate position, the dog 51 on the lever engaging the teeth 53 advances the cam sector 54 one tooth, where it is held by the hook 60 of the dog 61, and this movement of the cam sector advances the slide 79 one step to the left, to bring the pin 81 out of the path of the dog 94 and to bring the pin 81$^b$ into the path of the dog 93. Assuming that the parts have moved to the intermediate position of Fig. 5, it will be noted that in this intermediate position, the nose of the dog 94 engages the shoulder 98 of the gear shifting sector 44 and during the further movement of the lever 38 to the full line position of Fig. 6, it carries with it the gear shifting sector 44 through an angle of 60 degrees at the same time rotating the sector 44$^a$ in the opposite direction through the same angle. As the shaft 31 is splined to the sector 44, it will be rocked 60 degrees and as the hub 33 is in the recess 34 of the collar on the slide shaft 36, the latter will be shoved in to bring the sliding gear into mesh for the first speed. When the gear shifting sectors 44 and 44$^a$ were first moved, the notch 114 working on the rounded end or nose 113 of the lever 110 swung the latter to the dotted line position of Fig. 15 and full line position of Fig. 6, and as it moved to this position, the arm 111 striking the shoulder 112 rocked the dog 61 whose shoulder 64 engaging the flange 62 also lifted the dog 51, raising them both out of mesh with the teeth 53, so that the spring 56 returned the cam sector 54 to its initial position. The head 109 of the lever 110 remaining in the full line position of Fig. 6, when the lever 38 swings back to its dotted line position of Fig. 5, the lug 108 on its end engaging the head 109 holds the lever in said dotted line position so long as the machine is kept in the first speed. As the lever 38 swings back from its full line position of Fig. 6 to its dotted line position, the nose of the dog 94 rides over the cam 100 and shifts the position of said dog to that shown in dotted lines in said figure and this movement of the dog 94 causes the dog 93 to be shifted so that its nose is brought into engagement with the abutment 97$^a$ on the gear shifting sector 44$^a$. When the speed is to be changed, the first thing is to pull the lever 38 from the dotted line position of Fig. 6 to the full line position, and during this movement, the dog 93 engaging the abutment 97$^a$ moves the gear shifting sector 44$^a$ back to its initial position, thus shifting the shafts 31 and 36 back to the initial position shown in Figs. 2 and 3. As the lever 110 can now swing to its initial full line position of Fig. 15, its head 109 is out of the path of the lug 108, and when the lever 38 is released, it is free now to fly back to its initial position shown in Fig. 4.

Assuming now that the drive is to be set for the second speed, the lever 38 is pulled from the position of Fig. 4 to the intermediate position of Fig. 5, and the action of the parts so far is precisely the same as the corresponding pull in setting it for the first speed, but instead of continuing the pull substantially beyond this intermediate position and thus moving the gear shifting sectors 44 and 44$^a$, the line 37 is released and the lever 38 is allowed to swing back to its initial position, but it leaves the cam sector 54 and the plate 79 in their new position in which both have been advanced one tooth or step. As the lever 38 swings back, the tail of the dog 93 engages the pin 81$^b$ on the slide 79, and rocks the dogs 93 and 94 to the reverse position from that they originally had, so that when at the end of the second selecting stroke the lever 38 is pulled on through to its final position, the dog 93 engages the shoulder 97 on the sector 44$^a$ and swings said sector forward with the result that the sector 44 is swung backward, and it being splined to the shaft 31 swings it backward and thus pulls the shaft 36 out of the gear casing instead of shoving it in as it did for the first speed. This movement shifts the gear moved with the shaft 36 so that the gears are meshed for the second speed. The line 37 is then released and the lever 38 moves back to the dotted line position of Fig. 6 as before, and the parts are set as in Fig. 6 except that the relative positions of the sectors 44 and 44$^a$ are reversed. When the speed is to be changed, the lever 38 is again pulled forward to its final position, and as the dogs 93 and 94 were again shifted by the cooperation of the dog 93 with the cam surface 99, during the return of the lever 38 from the operating stroke to the intermediate dotted line position of Fig. 6, during the forward movement of this last stroke, the dog 94 engages the shoulder 98$^a$ to swing both gear shifting sectors back to their initial positions.

With the parts again set to their initial position shown in Fig. 4, if it is desired to start on the third speed, the lever 38 is pulled forward twice to the intermediate position and allowed to return to initial position each time, with the result as before, that the cam sector 54 is advanced two teeth 53, and the slide 79 is moved to the left two steps bringing the pin 81$^a$ in the path of the dog 94 as the lever 38 swings back the second time, swinging the dogs 93 and 94 to the position shown in Figs. 4 and 14, they having been swung to the other position during the first return by the dog 93 engaging the pin 81$^b$. During the third pull from initial to intermediate position, the cam sector 54 is advanced another tooth 53 and the pin 81$^c$ is brought beneath the dog 93. At the same time, the cam surface 67 (see Fig. 10) rides over the roller 66, swinging the forked lever 69 into the dotted line position of Fig. 8, so that when the lever 38 is pulled on through to its final position after the third setting stroke, the shaft 36ª is shoved in so that its fork slides its gear to mesh for the third speed. When the lever 38 returns to the intermediate position as seen in dotted lines in Fig. 6, the action of the elements is as before during its return from setting the first speed, and when the speed is to be changed, the lever 38 is pulled from said intermediate to its final position and allowed to return to initial position as before, resetting all the parts.

If it is desired to start on the fourth speed, the lever 38 is pulled to intermediate position and allowed to return three times, and in the third return, dog 93 engages the pin 81ᶜ and is rocked to bring its face into the arc of the shoulder 97, so that when after the fourth setting stroke, the lever 38 is pulled on through to its final position, the gear shifting sector 44ª is rocked forward and the shaft 31 is rocked backward, pulling the shaft 36ª out from the gear casing and shifting its connected gear to mesh for the fourth speed. When the speed is to be changed, the lever 38 is pulled from the intermediate dotted line position of Fig. 6 to its final position with the usual result of resetting all the parts to their initial position.

In case of a mistake in the selecting strokes, to correct it, all that is necessary is to continue the selecting pulls from initial to intermediate until five of them are made after which the lever 38 is pulled on to its final position and the action indicated in Fig. 10 occurs. Here the advance of the cam sector 54 by the nose 52 engaging the fifth tooth 53 brings the parts to the position shown in Fig. 10 with the lever 116 in its dotted line position to which it is moved by the projection 124 contacting with the shoulder 123. While the dogs and levers are in the full line position shown in Fig. 9, and before the teeth 53 are released from the dogs 51 and 61, the continued movement of the lever 38 causes the cam lug 122 thereon to engage the cam flange 121 and rock the lever 116 to the full line position shown, but before this position has been reached, the dogs 51 and 61 have been lifted out of the teeth 53 and the spring 56 has thrown the cam sector 54 back to the initial position shown in Fig. 9. When the cam lug 122 passes the cam flange 121, the spring 118 throws the lever 116 back to its initial position seen in Fig. 9, and as the gear shifting sectors 44 and 44ª have never been moved during this setting operation, there is nothing to prevent the lever 38 from flying back to initial position when the line 37 is released, and thus all parts are restored to their initial position ready to begin all over again. It will thus be seen that by the mechanism shown I am enabled to meet all the conditions necessary to fully control the speed by simply pulling in the manner described on the line 37.

While I have shown the line 37 as leading directly back to the trailer or elsewhere from the lever 38, I might reverse the movement of the lever and run the line 37 over a swinging guiding sheave, thus giving somewhat better control of the same, but I consider that such a change would be obvious.

In Figs. 16 and 17 I have illustrated a modification in the means for connecting the rocking shaft 31 to the sliding shafts 36 and 36ª. In this form, the place of the arm 32 is taken by an L-shaped arm 32ª having a ring 33ª in its end through which passes the end of the customary gear shifting lever 127 having the bearing ball 128 mounted as usual and its lower end extending into the recesses 34 and 34ª as it is shifted by the novel mechanism shown instead of by hand. It can, however, be shifted by hand, if desired, as the resultant movement of the shaft 31 swings only the gear shifting sectors 44 and 44ª and their connecting gear pinions 103 and 104 which offer but little frictional resistance to this movement.

In Figs. 20 and 21, I illustrate another method of mounting my invention as an attachment. Here the lever 127 forms a part of the regular tractor equipment and has secured to it a fork 129, in which is pivoted a link lever 130, which has its other end fulcrumed on a rod 131, its horizontal lower end having an elongated bearing to prevent the rod 131 swinging in more than one plane in the bracket 132 extending from the frame or casing 47 which is secured to the tractor by the bracket 133 attached thereto and bolted to the rear axle casing 134 of the tractor. The shaft 31 has secured to its outer end a forked arm 32ᵇ in which the link lever 130 is pivoted, so that it operates as a lever of the third class, fulcrumed on the rod 131 which can swing backward and forward as the shaft 31 rocks, but which resists sidewise movement so that the sliding movement of the shaft 31 is transmitted as power applied to the load of swinging the lever 127 sideways through a longer arc.

In Fig. 20, I have illustrated the tractor as started and stopped and steered by the line drive mechanism shown in my application No. 403,735, filed August 16, 1920, the patent for which I expect to have issue simultaneously herewith and to which patent reference is made for the fuller description of any features that need not be considered at length here. The control of this mechanism is by a pair of lines 224 and 225 passed over a pair of swinging sheaves 226 and 226ª connected to a pair of swinging levers 228 and 228ª carrying the sheaves 229 and 229ª which act as belt tighteners to start gearing driven by the engine shaft when clutched to turn the steering wheel 11 to the right or left as occasion demands. After passing the sheaves 226, the lines 224 and 225 are passed over guiding sheaves 135 and 135ᵃ on the tractor and attached to a pair of spring drawn latch levers 238 pivoted on opposite sides of the clutch shifter lever 217 and connected to the latch bars 242 cooperating with recesses 249 and 250 in a pair of sectors 251 and 251ᵃ between which the lever 217 swings with its fulcrum shaft 218. Each of the sectors 251 and 251ᵃ has a recess 250, but preferably only one of them has a recess 249, so that both lines 224 and 225 must be pulled simultaneously to unlock the lever 217 when it is in the position shown. When both are pulled simultaneously that releases the lever which can then be pulled to the position in which one of the latch bars 242 engages the notch 249 and the engine clutch is disengaged. When the lever 217 is in the clutching position shown, either line can be pulled alone without affecting the lever, thus enabling me to swing the levers 228 to control the steering. In Fig. 20 I have shown the two sets of line controlled apparatus as entirely separate, thus requiring the use of the three lines 37, 224 and 225.

In the construction shown in Figs. 1, 1ᵃ, 18 and 19, I have combined the two line drive devices, so that only two lines, 224 and 237 are needed. The line 224 is used just as before, but the line 237 after passing over the sheave 135ᵃ passes over a sheave 136 carried by the end of the lever 38 in this form, and then back over the sheave 135ᵇ and thence to the latch lever 238 that is connected to the latch bar 242 that co-operates with the segment 251 that has no notch 249, so that when the clutch lever 217 is in its unclutching position, and the tractor has stopped, the line 237 can be pulled to manipulate the lever 38 just as if it were connected directly thereto instead of to the latch lever 238, the only difference being that it has to be pulled twice as far to get the same results if the same length of lever 38 is employed, and to obviate this objectionable feature, I shorten the lever 38 in this form as shown. It also has to be pulled somewhat further to take up the slack permissible by the arm 228 swinging out and the lever 238 to which it is connected rocking. The rocking of the latter is immaterial, as the lever 217 is held fixed by the other latch bar 242 engaging the recess 249, and the swinging of the arm 228, tightening the co-operating belt is also immaterial since as the engine is unclutched, the gearing is not driven to rotate the steering wheel. However, the manipulation of the line 237 for steering and to stop the tractor would operate the lever 38, if it were not locked when the engine is clutched, and to prevent this, I employ the locking mechanism best shown in Fig. 19, where it will be seen that I place on one side of the lever 38 (preferably on the inner side where the fork begins) a lug 134 which co-operates with the recess 138 and shoulder 138ᵃ in the bell crank lever 140 fulcrumed on an arm 141 extending from the casing 47. The vertical arm 139 of the lever has an aperture 142 therein through which extends the end of a thrust rod 143 having the adjustable abutment 144 secured thereon by the screw 145 thereon and pivoted at its other end to an arm 146 on the rock shaft 218 on which the clutch lever 217 is secured. The lug 144 is adjusted so that when the lever 217 is reaching its stopping position with the latch bar 242 engaging the notch 249, the lug 144 strikes the arm 139 and rocks the lever 140 so as to free the lever 38 from the notch 138 or shoulder 138ᵃ, as it must be subject to manipulation when the tractor is stopped, but not when it is running, to prevent interference with the steering. With the lever 217 locked in its rearward position, the line 237 is manipulated in just the same manner as the line 37 previously described, and after the required setting strokes the lever 38 is pulled through to the position shown in full lines in Fig. 6 and held there while the line 224 is pulled to lift the latch bar 242 out of the notch 249, and then both lines are released. This allows the lever 217 to swing back under the pull of the spring 217ᵃ before the latch bar 242 can catch in the notch 249, and as the spring 217ᵃ is stronger than the spring 39, the abutment 144 moves away from the arm 139 and allows the lever 140 to fall under the pull of its spring 140ᵃ so that the notch 138 catches over the lug 134 and holds the lever 140 locked in the position shown in Fig. 6 so long as the tractor is running, so that the fact that it is attached to the gear shifting lever does not interfere with the manipulation of the line 237 for steering. When the tractor is stopped by pulling both lines 224 and 237 until the lever 217 is brought to the rear, then the lever 38 is unlocked, as before explained, and flies back under the action of the spring 39 when the line 237 is released to its initial position shown in Fig. 4, from which it is free to be drawn so long as the tractor is unclutched to set the gear for a new speed as heretofore explained. By the combination shown, it will be seen that I can both start, stop, steer and change the speeds by the manipulation of a single pair of lines.

In further explanation of the steering device herein shown, I may repeat that the engine shaft 13 is connected by the customary clutch 14 with the driving shaft 15 which is connected to the rear axle 23 in the manner already described so that the ratio of speed can be adjusted by the mechanism previously described. The rock shaft 218 on which the lever 217 is secured has a cam lug 219 seen in Fig. 26, engaging a forked lever 220 which shifts the clutch sleeve 221 to disengage the engine when the lever 217 is drawn to the rear as described. The helically coiled contractile spring 217ª connected to the lever 217 pulls it forward to its clutching position when it is released by simultaneously pulling both lines and then letting go. The steering wheel 11 is secured on the customary shaft having on its lower end the bevel pinion 9 meshing with the bevel sector 8 secured upon the rock shaft 7 carrying an arm 6 connected by a link 5 with a steering knuckle 2 of one of the front wheels 1. The shaft of the steering wheel has secured on it a worm gear wheel 233 shown in dotted lines in Fig. 1ª rotated by a worm 258 on a shaft 257 having secured thereon a wide pulley wheel 256 over which runs a pair of belts 258 and 259, one crossed, which also run over a wide belt wheel 260 secured on a shaft 263, driven, as seen in dotted lines, by a miter gear connection with the driving shaft 15 clutched to the engine shaft 13. A pair of belt pulleys 229, each journaled in a separate swinging arm 228 serve as belt tighteners when they are drawn rearward by pulling on the line 224 or the line 237, which run over the sheaves 226 loosely mounted on the arms 228.

When the belt pulley 229ª is pulled out by the line 224, it tightens the belt 258 which causes the shaft 263 to rotate the worm 238 in the proper direction to turn the steering shaft, and consequently the truck, to the right. When the line 237 is pulled to steer, it tightens the belt 259 which rotates the worm 238 in the other direction to turn the tractor to the left.

I am aware that prior to my invention line operated gear changing mechanism has been employed in which each setting pull was followed by a resetting or a releasing pull, so that in passing from the first position to the fourth, it was necessary to actually shift the gears through the first, then through the second, and finally through the third position before the fourth could be reached, and I do not claim the same as my invention, as with my device there is no intermediate shifting of the gears to reach any position, as once the selection is made, the gears are shifted directly to that position.

I am also aware that prior to my invention a pair of lines has been used, one to operate the starting and stopping clutch and turn the steering wheel manually in one direction, and the other to operate the gear changing mechanism and turn the steering wheel manually in the other direction, and I do not claim the same as my invention, as in my device the lines operate controlling means for power driven steering mechanism and not merely a manually moved steering wheel.

While I have herein shown my novel gear shifting mechanism as combined with a novel line drive for tractors, I do not herein claim the same, but reserve the subject matter thereof for a divisional application.

While I have shown and described my invention as embodied in the forms which I at present consider best adapted to carry out its purposes, it will be understood that it is capable of very wide variations and modifications, and that I do not desire to be limited in the interpretation of the following claims except as may be necessitated by the state of the prior art.

What I claim as new, and desire to secure by Letters Patent of the United States is:

1. In an apparatus of the class described, the combination with a gear changing element movable to a plurality of different operative positions to control the speed, of a selecting member movable to different positions to determine how the gear changing element shall be moved, a line, and connections between said line and the selecting member whereby by pulling on the line in different ways the selecting member can be moved to its different selective positions.

2. In an apparatus of the class described, the combination with a gear changing element movable to a plurality of different operative positions to control the speed, of a selecting member movable to different positions to determine how the gear changing element shall be moved, a line, and connections between said line and the selecting member whereby by pulling on the line in different ways the selecting member can be moved to its different selective positions and then moved additionally to force the gear changing element to its desired position.

3. In a device of the class described, the combination with a pair of gear changing elements, each movable to a plurality of different operative positions to control the speed, of a selecting member movable to different positions to determine which of the gear changing elements shall be engaged and how it shall be moved, a line, and connections between said line and said selecting member whereby by pulling on the line in different ways the selecting member can be moved to its different selective positions in each of which only one of said gear changing elements is engaged.

4. In a device of the class described, the combination with a pair of gear changing elements, each movable to a plurality of different operative positions to control the speed, of a selecting member movable to different positions to determine which of the gear changing elements shall be engaged and how it shall be moved, a line, and connections between said line and said selecting member whereby by pulling on the line in different ways the selecting member can be moved to its different selective positions in each of which only one of said gear changing elements is engaged and then moved additionally to force the selected gear changing element to its desired position.

5. In a device of the class described, the combination with a gear changing element slidable to different positions to control the speed, of a selecting member rocked in different directions to determine which way the gear changing element shall be moved, a line, and connections between said line and selecting member whereby by pulling on the line in different ways the selecting member can be rocked in the selected direction.

6. In a device of the class described, the combination with a pair of gear changing elements each slidable in opposite directions from the neutral position to control the speed, of a rocking selecting member slidable to different positions to determine which of the gear changing elements shall be engaged thereby and how it shall be moved, a line, and connections between said line and selecting member whereby by pulling on the line in different ways the selecting member can be slid to its different selective positions to determine which of the gear changing elements is moved, and finally rocked to move the selected element in the desired direction.

7. In an automotive device, the combination with a frame, of a continuously running driving member carried thereby, a propelling member associated with the frame, operating connections from the driving member to the propelling member that can be engaged to drive the propelling member and disengaged to stop it, said connections including gear changing mechanism to control the ratio of propulsion, a pair of lines, and mechanism connecting said lines to said operating connections arranged so that the latter can be engaged or disengaged or the gear changed by pulling the lines, said mechanism containing positive interlocking devices to lock the gear changing mechanism from operation while the propelling member is running.

8. In an automotive device, the combination with a frame, of a continuously running device driving member carried thereby, a propelling member associated with the frame, operating connections including a clutch from the driving member to the propelling member that can be engaged to drive the propelling member and disengaged to stop it, said operating connections including gear changing mechanism to control the ratio of propulsion, a pair of lines, and mechanism connecting said lines to said operating connections arranged so that the clutch can be engaged or disengaged or the gear changed by pulling the lines, said mechanism containing positive interlocking devices to lock the gear changing mechanism from operation while the clutch is engaged.

9. In a gear changing device, the combination with a gear changing element movable in a plurality of ways to change the gears, of a selecting element movable to determine which of the ways said gear changing element shall move, and connections between said selecting element and gear changing element whereby the selection is controlled by the number of movements given to the selecting element.

10. In a gear changing device, the combination with a gear changing element movable in a plurality of ways to change the gears, of a selecting element movable to determine which of the ways said gear changing element shall move, and connections between said selecting element and gear changing element whereby the selection is controlled by the number of movements given to the selecting element, said connections containing means which are adjustable to determine which selection shall be made by the fewest number of movements.

11. In a gear changing device, the combination with a gear changing element movable in a plurality of ways to change the gears, of a selecting element movable to determine which of the ways said gear changing element shall move, and connections between said selecting element and gear changing element whereby the selection is controlled by the number of movements given to the selecting element, said connections containing means which are adustable to determine what selections shall be made by the particular number of movements.

12. In a gear changing device, the combination with a gear changing element movable in a plurality of ways to change the gears, of a selecting element movable a variable number of times to determine which of the ways said gear changing element shall move, and connections between said selecting element and gear changing element whereby the selection is controlled by the number of selecting movements given to the selecting element and the final setting effected by the movement of the selecting element beyond the position to which it is brought by its selecting movement.

13. In a gear changing device, the combination with a gear changing element movable in a plurality of ways to change the gears, of a selecting and setting element movable from its initial position to an intermediate position to determine which of the ways the gear changing element shall move, and from said intermediate to a final position to effect said movement of the gear changing element, means to return automatically the selecting and setting element from its intermediate to its initial position and from its final to its intermediate position, and connections between said selecting and setting element and the gear changing element whereby selection is controlled by the number of selective movements given to the selecting and setting element from initial to intermediate position and the movement of the selecting and setting element from intermediate position to its final position effects the movement of the gear changing element.

14. In a gear changing device, the combination with a gear changing element movable in a plurality of ways to change the gears, of a selecting and setting element movable from its initial position to an intermediate position to determine which of the ways the gear changing element shall move, and from said intermediate to a final position to effect said movement of the gear changing element, means to return automatically the selecting and setting element from its intermediate to its initial position and from its final to its intermediate position, and connections between said selecting and setting element and the gear changing element whereby selection is controlled by the number of selective movements given to the selecting and setting element from initial to intermediate position and the movement of the selecting and setting element from intermediate position to its final position effects the movement of the gear changing element, said connections including means to stop the selecting and setting element at its intermediate position on its first return from initial position.

15. In a gear changing device, the combination with a gear changing element movable in a plurality of ways to change the gears, of a selecting and setting element movable from its initial position to an intermediate position to determine which of the ways the gear changing element shall move, and from said intermediate to a final position to effect said movement of the gear changing element, means to return automatically the selecting and setting element from its intermediate to its initial position and from its final to its intermediate position, and connections between said selecting and setting element and the gear changing element whereby selection is controlled by the number of selective movements given to the selecting and setting element from initial to intermediate position and the movement of the selecting and setting element from intermediate position to its final position effects the movement of the gear changing element, said connections including means to stop the selecting and setting element at its intermediate position on its first return from initial position but permitting it to return to initial position on its second return from final position to which it is moved to reset the gear changing element to neutral position.

16. In a gear changing device, the combination with a gear shifting element movable in a plurality of ways from its neutral position, of a combined selecting and setting member movable in one direction only, and connections between the element and member whereby said member can be first moved to determine which way the element shall move from neutral, then moved to shift the gear, and finally moved to return the element to neutral.

17. In a gear changing device, the combination with a gear shifting element movable in a plurality of ways from its neutral position, of a combined selecting and setting member positively movable in one direction only, means to return automatically the member to the position from which it is moved, and connections between the element and member whereby said member can first be moved to determine which way the element shall move from neutral, automatically returned to initial position if released, then moved to shift the gear, automatically returned, finally positively moved to return the element to its neutral position, and automatically returned to initial position after its last stroke.

18. In a gear changing device, the combination with a pair of gear shifting elements movable in a plurality of ways from their neutral positions, of a combined selecting and setting member movable in one direction only, and connections between the elements and the member whereby said member can be first moved to determine which one of the elements shall be moved and which direction it shall move from neutral, then moved to shift the gear, and finally moved to return the element to neutral.

19. In a gear changing device, the combination with a gear shifting element movable in a plurality of ways from its neutral position, of a combined selecting and setting member movable in one direction only, and connections between the element and member whereby said member can be first moved to determine which way the element shall move from neutral, then moved to shift the gear, and finally moved to return the element to neutral, said connections including a shaft adapted to be rocked backward or forward depending upon the selection.

20. In a gear changing device, the combination with a pair of gear shifting elements, movable in a plurality of ways from their neutral positions, of a combined selecting and setting member movable in one direction only, and connections between the elements and the member whereby said member can be first moved to determine which one of the elements shall be moved and which direction it shall move from neutral, then moved to shift the gear, and finally moved to return the element to neutral, said connections including a shaft adapted to be slid lengthwise to determine which of the elements is moved and rocked backward or forward depending upon the direction the element is to be moved.

21. In a gear changing device, the combination with a gear shifting element movable in a plurality of ways from its neutral position, of a combined selecting and setting member movable in one direction only, and connections between the element and member whereby said member can be first moved to determine which way the element shall move from neutral, then moved to shift the gear, and finally moved to return the element to neutral, said connections including an element moved step by step during the selective strokes of the member to determine which way the gear selecting element shall be moved.

22. In a gear changing device, the combination with a pair of gear shifting elements movable in a plurality of ways from their neutral position, of a combined selecting and setting member movable in one direction only, and connections between the elements and the member whereby said member can be first moved to determine which of the elements is moved from neutral and which way it is moved, then moved to shift the gear, and finally moved to return the element to neutral, said connections including an element moved step by step during the selective strokes of the member to determine which of the gear selecting elements shall be moved and the way it shall be moved.

23. In a gear changing device, the combination with a gear shifting element movable in a plurality of ways from its neutral position, of a combined selecting and setting member movable in one direction only, and connections between the element and member whereby said member can be first moved to determine which way the element shall move from neutral, then moved to shift the gear, and finally moved to return the element to neutral, said connections including a pair of members alternately operated by the selecting and setting member during its setting stroke depending upon the selection made.

24. In a device of the class described, the combination with a ratcheted cam sector, of an operating lever therefor, an operating dog carried thereby, a detent pawl, and connections between the dog and pawl for lifting the former out of the teeth after the sector has been advanced one tooth.

25. In a device of the class described, the combination with a ratcheted cam sector, of an operating lever therefor, an operating dog carried thereby, a detent pawl, connections between the dog and the pawl for lifting the latter out of the teeth after the sector has been advanced on one tooth, a sliding plate, and a cam surface on the cam sector cooperating with the sliding plate.

26. In a device of the class described, the combination with a ratcheted cam sector, of an operating lever therefor, an operating dog carried thereby, a detent pawl, connections between the dog and pawl for lifting the former out of the teeth after the sector has been advanced one tooth, a sliding bar, a lever operatively connected thereto, and a cam surface on the cam sector cooperating with the last mentioned lever to shift the bar.

27. In a device of the class described, the combination with a ratcheted cam sector, of an operating lever therefor, an operating dog carried thereby, a detent pawl, connections between the dog and pawl for lifting the former out of the teeth after the sector has been advanced one tooth, a sliding plate, a sliding bar, a lever cooperating with the sliding bar, and cam surfaces on the cam sector cooperating with the plate and with the last mentioned lever for the purpose described.

28. In a device of the class described, the combination with a reciprocating operating element, of means to move it automatically in one direction, a pair of pawls carried by the operating element movable into and out of operative position, a pair of reciprocating setting elements actuated by the pawls, connections between said reciprocating setting elements compelling them to move simultaneously in the opposite direction, connections between the pawls holding them alternately in operative position, means for shifting the position of the pawls at each reciprocation of the operating element, a reciprocating gear shifting element connected to one of the reciprocating setting elements, and means for displacing the reciprocating gear shifting element after a definite number of movements of the reciprocating operating element.

29. In a device of the class described, the combination with a reciprocating operating element, of means to move it automatically in one direction, a pair of pawls carried by the operating element movable into and out of operative position, a pair of reciprocating setting elements actuated by the pawls, connections between said reciprocating setting elements compelling them to move simultaneously in the opposite direction, connections between the pawls holding them alternately in operative position, and means for shifting the position of the pawls at each reciprocation of the operating element.

30. In a device of the class described, the combination with a pair of reciprocating setting elements, of connections between said elements compelling them to move simultaneously in opposite directions, a pair of reciprocating pawls for actuating the setting elements, connections between the pawls holding them alternately in operative position, a reciprocating gear shifting element connected to one of the reciprocating setting elements, and means for displacing the reciprocating gear shifting element after a definite number of movements of the pawls.

31. In a gear changing device, the combination with a gear shifting element movable into a plurality of positions from neutral to change the gears, of a gear selecting element movable to pass directly from one selection to another without finally moving the gear shifting element, a single operating element movable in a single plane only for preliminarily moving the gear selecting element for selection, and for finally moving the gear selecting element after selection to move the gear shifting element as selected, and connections between said elements whereby the gear shifting element can be finally moved by said operating element in accordance with the latest selection of the gear selecting element.

32. In a gear changing device, the combination with a gear shifting element movable into a plurality of positions from neutral to change the gears, of a gear selecting element movable to pass directly from one selection to another without finally moving the gear shifting element, an operating element to advance the gear selecting element step by step, and connections between said elements whereby the gear shifting element can be finally moved by power applied to the operating element in accordance with the latest selection of the gear selecting element.

33. In a gear changing device, the combination with a gear shifting element movable into a plurality of positions from neutral to change the gears, of a gear selecting element movable to pass directly from one selection to another without finally moving the gear shifting element, an operating element reciprocable through a fixed path to advance the gear selecting element step by step, one step for each reciprocation, and connections between said elements whereby the gear shifting element can be finally moved in accordance with the latest selection of the gear selecting element by a further movement of the operating element.

34. In a gear changing device, the combination with a shaft capable of being moved longitudinally to control the selection and rocked to effect it, of a single element and connections thereto by which the operation of said single element in a single plane serves to move it longitudinally and subsequently to rock it.

35. In a gear changing device, the combination with a shaft capable of being moved longitudinally to control the selection and rocked in opposite directions to effect it, of a pair of reversing elements mounted on the shaft and one of them moving it, means connecting the reversing elements and compelling them to move in opposite directions, selecting mechanism for determining which of the reversing elements shall move, and means for moving the reversing element.

36. In an automotive device, the combination with a gear changing lever, of a clutch lever to start and stop, a spring catch to hold the clutch lever in its unclutched position, and interlocking connections between said levers that prevent the movement of the gear changing lever until the clutch lever is in its unclutched position and the spring catch ready to operate.

37. In a gear changing device, the combination with gear changing elements movable to change the gears, of a selecting element movable to determine which of said gear changing elements shall be moved, and connections between said selecting element and said gear changing elements whereby the selection is controlled by the number of movements given to the selecting element, said connections containing means which are adjustable to determine what selections shall be made by any particular number of movements.

38. In a gear changing device, the combination with gear changing elements movable to change the gears, of a selecting element movable to determine which of said gear changing elements shall be moved, and connections between said selecting element and said gear changing elements whereby the selection is controlled by the number of movements given to the selecting element, said connections containing means which are adjustable to determine which selection shall be made by the fewest number of movements.

In witness whereof, I have hereunto set my hand this 28th day of June, A. D. 1921.

LUDWIG HOLLAND-LETZ.